(12) United States Patent
Huang et al.

(10) Patent No.: US 10,530,463 B2
(45) Date of Patent: Jan. 7, 2020

(54) METHOD OF EXTENDING RF SIGNALS IN A WIRELESS CONTROL SYSTEM

(71) Applicant: GRAND MATE CO., LTD., Taichung (TW)

(72) Inventors: Chung-Chin Huang, Taichung (TW);
Chin-Ying Huang, Taichung (TW);
Hsin-Ming Huang, Taichung (TW);
Hsing-Hsiung Huang, Taichung (TW);
Yen-Jen Yeh, Taichung (TW);
Chiang-Wen Lai, Taichung (TW)

(73) Assignee: GRAND MATE CO., LTD., Taichung (TW)

( * ) Notice: Subject to any disclaimer, the term of this patent is extended or adjusted under 35 U.S.C. 154(b) by 0 days.

(21) Appl. No.: 15/815,156

(22) Filed: Nov. 16, 2017

(65) Prior Publication Data

US 2019/0149221 A1 May 16, 2019

(51) Int. Cl.
*H04B 7/155* (2006.01)
*H04B 7/26* (2006.01)
(Continued)

(52) U.S. Cl.
CPC ..... *H04B 7/15507* (2013.01); *H04B 7/15535* (2013.01); *H04B 7/15592* (2013.01);
(Continued)

(58) Field of Classification Search
CPC ............ H05B 33/0809; H05B 33/0854; H05B 37/0227; H05B 37/0272; H02J 7/34;
(Continued)

(56) References Cited

U.S. PATENT DOCUMENTS 6,512,773 B1  1/2003 Scott
6,968,153 B1  11/2005 Heinonen et al.
(Continued)

FOREIGN PATENT DOCUMENTS

TW   517476 B   1/2003
TW   I256795 B  6/2006

OTHER PUBLICATIONS

Examination report for TW106121435, dated Dec. 19, 2017, Total of 5 pages.
(Continued)

*Primary Examiner* — Mewale A Ambaye
(74) *Attorney, Agent, or Firm* — Tracy M. Helms; Apex Juris, pllc.

(57) ABSTRACT

A method of extending RF signals in a wireless control system which includes a first electronic device, a second electronic device, and an RF signal extender. RF signal coverage areas of the electronic devices partially overlap, and each of the electronic devices is out of the RF signal coverage area of the other one. The RF signal extender is in an overlapping area between the RF signal coverage areas, and the electronic devices are in an RF signal coverage area of the RF signal extender. The method includes the steps of: receiving an RF signal with the RF signal extender; analyzing the received RF signal to retrieve the data carried therein; and compiling the data into an RF signal for transmission if the retrieved data follows an RF communication protocol of the wireless control system. Whereby, a total RF signal coverage area can be expanded, and interferences can be reduced.

5 Claims, 3 Drawing Sheets

(51) Int. Cl.

| | |
|---|---|
| H04B 7/04 | (2017.01) |
| H04W 84/12 | (2009.01) |
| H04W 52/46 | (2009.01) |
| H04W 52/02 | (2009.01) |
| H04W 4/80 | (2018.01) |
| H04L 29/08 | (2006.01) |
| H04L 29/06 | (2006.01) |

(52) U.S. Cl.
CPC ............ H04B 7/2606 (2013.01); H04B 7/04 (2013.01); H04L 63/08 (2013.01); H04L 67/10 (2013.01); H04L 67/12 (2013.01); H04W 4/80 (2018.02); H04W 52/0216 (2013.01); H04W 52/0219 (2013.01); H04W 52/0241 (2013.01); H04W 52/46 (2013.01); H04W 84/12 (2013.01)

(58) Field of Classification Search
CPC . H02J 9/02; H04L 63/08; H04L 67/10; H04L 67/12; H04W 4/80; H04W 52/0216; H04W 52/0219; H04W 52/0241; H04W 52/46; H04W 84/12; H04W 88/02
See application file for complete search history.

(56) References Cited

U.S. PATENT DOCUMENTS

| | | | | |
|---|---|---|---|---|
| 9,781,603 | B1* | 10/2017 | Nenov | G06F 9/45533 |
| 2002/0111135 | A1 | 8/2002 | White | |
| 2004/0146013 | A1 | 7/2004 | Song et al. | |
| 2005/0010817 | A1* | 1/2005 | Jakubik | H04L 63/1425 |
| | | | | 726/4 |
| 2006/0182017 | A1* | 8/2006 | Hansen | H04B 7/02 |
| | | | | 370/208 |
| 2007/0067487 | A1* | 3/2007 | Freebairn | H04L 12/6402 |
| | | | | 709/238 |
| 2007/0076742 | A1* | 4/2007 | Du | H04L 47/14 |
| | | | | 370/445 |
| 2007/0153725 | A1* | 7/2007 | Waxman | H04W 16/00 |
| | | | | 370/329 |
| 2009/0204265 | A1* | 8/2009 | Hackett | G05B 19/4185 |
| | | | | 700/284 |
| 2009/0252090 | A1* | 10/2009 | Xu | H04W 76/15 |
| | | | | 370/328 |
| 2009/0284376 | A1* | 11/2009 | Byun | G06K 19/0717 |
| | | | | 340/572.1 |
| 2011/0111700 | A1* | 5/2011 | Hackett | A01G 25/16 |
| | | | | 455/41.2 |
| 2013/0070745 | A1* | 3/2013 | Nixon | H04L 45/74 |
| | | | | 370/338 |
| 2013/0229925 | A1* | 9/2013 | Kitada | H04L 43/08 |
| | | | | 370/246 |
| 2015/0178243 | A1* | 6/2015 | Lowery | G06F 3/0619 |
| | | | | 709/212 |
| 2016/0330825 | A1* | 11/2016 | Recker | H05B 37/0272 |
| 2017/0171889 | A1* | 6/2017 | Biswas | H04W 74/0816 |
| 2017/0223734 | A1* | 8/2017 | Lin | H04L 29/06 |
| 2017/0264558 | A1* | 9/2017 | Higuchi | H04L 1/189 |
| 2018/0145921 | A1* | 5/2018 | Gupta | H04L 47/625 |

OTHER PUBLICATIONS

Search report for TW106121435, dated Dec. 4, 2017, Total of 1 page.
English Abstract for TW517476 (B), Total of 1 page.
English Abstract for TWI256795 (B), Total of 1 page.

* cited by examiner

METHOD OF EXTENDING RF SIGNALS IN A WIRELESS CONTROL SYSTEM

BACKGROUND OF THE INVENTION

1. Technical Field

The present invention relates generally to a wireless control system, and more particularly to a method of extending RF signals in a wireless control system.

2. Description of Related Art

A wireless control system uses 433 MHz or 315 MHz RF (radio frequency) signals to transmit control commands and to report operational status. A conventional wireless control system includes a first electronic device and a second electronic device, each of which has an RF signal coverage area, and is located with the RF signal coverage area of each other. The electronic devices transmit data back and forth with RF signals, and said data is the data of control commands or data of operational status. For example, the first electronic device is a control device, and the second electronic device is a controlled device; the first electronic device transmits RF signals carrying the data of control commands to the second electronic device, and the second electronic device operates accordingly based on the control commands. On the other hand, the second electronic device reports the RF signals carrying the data of operational status to the first electronic device. Whereby, the system can have the capacity of controlling and status reporting.

However, the RF signal coverage area of each of the electronic devices is limited. If one of the electronic devices leaves the RF signal coverage area of the other one, the control commands and data of operational status would not be able to be transmitted. In other words, the operable area of the wireless control system is limited by this fact.

BRIEF SUMMARY OF THE INVENTION

In view of the above, the objective of the present invention is to provide a method of extending RF signals in a wireless control system, which could expand the total RF signal coverage area of the wireless control system.

Another objective of the present invention is to provide another method of extending RF signals in a wireless control system, which could reduce the interferences caused by RF signals of other wireless control systems.

The present invention provides a method of extending RF signals in a wireless control system, wherein the wireless control system includes a first electronic device, a second electronic device, and an RF signal extender. The first electronic device has a first RF signal coverage area, and the second electronic device has a second RF signal coverage area, wherein the second electronic device is located out of the first RF signal coverage area. The first RF signal coverage area partially overlaps the second RF signal coverage area, and the RF signal extender is located in an overlapping area between the first RF signal coverage area and the second RF signal coverage area. The RF signal extender has a third RF signal coverage area, and the first electronic device and the second electronic device are both located in the third RF signal coverage area. The method of extending RF signals is applied to the RF signal extender, including the follow steps: A. receive an RF signal; B. analyze the RF signal which is received to retrieve a piece of data carried in the RF signal; and C. determine whether the piece of data which is retrieved matches an RF communication protocol in the wireless control system; if so, compile the piece of data into another RF signal, and transmit the another RF signal.

By providing the RF signal extender between the first electronic device and the second electronic device, the total RF signal coverage area of the wireless control system could be extended, and the RF signals send by the RF signal extender would be ensured to follow the RF communication protocol in the wireless control system, which could reduce the interferences from the RF signals of other wireless control systems.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
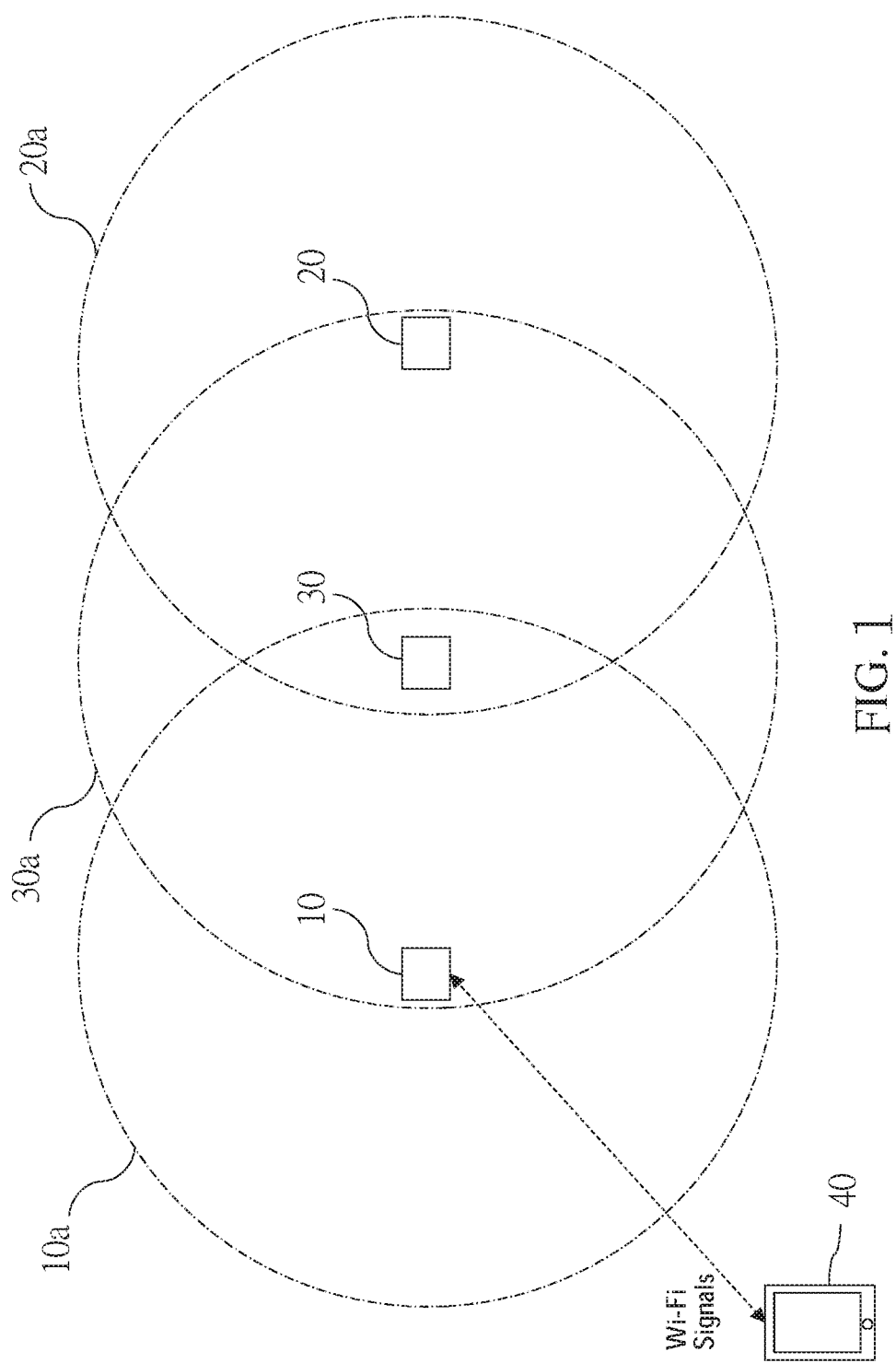
FIG. 1 is a structural diagram of a wireless control system using the method of extending RF signals of a first embodiment of the present invention.

A wireless control system is shown in FIG. 1, which is adapted to be applied with a method of extending RF signals of a first embodiment of the present invention, and includes a first electronic device 10, a second electronic device 20, and an RF signal extender 30, wherein the first electronic device 10 is a signal converter as an example, which could bi-directionally convert Wi-Fi signals into and from RF signals. The first electronic device 10 communicates with a portable device 40 with Wi-Fi signals, whereby to receive the data sent from the portable device 40 and to transmit data to the portable device 40. A working frequency of the aforementioned RF signals is 433 MHz or 315 MHz, and the first electronic device 10 has a first RF signal coverage area 10a.

The second electronic device 20 is a home appliance as an example, which could receive RF signals carrying data of control commands, and transmit RF signals with data of operational status. The second electronic device 20 is located out of the first RF signal coverage area 10a, and has a second RF signal coverage area 20a, which partially overlaps with the first RF signal coverage area 10a.

The RF signal extender 30 is located at the overlapping area between the first RF signal coverage area 10a and the second RF signal coverage area 20a, and the RF signal extender 30 has an RF transceiver module (not shown), which is adapted to transmit and receive RF signals. The RF signal extender 30 has a third RF signal coverage area 30a, and the first electronic device 10 and the second electronic device 20 are both located in the third RF signal coverage area 30a.

Figure 2:
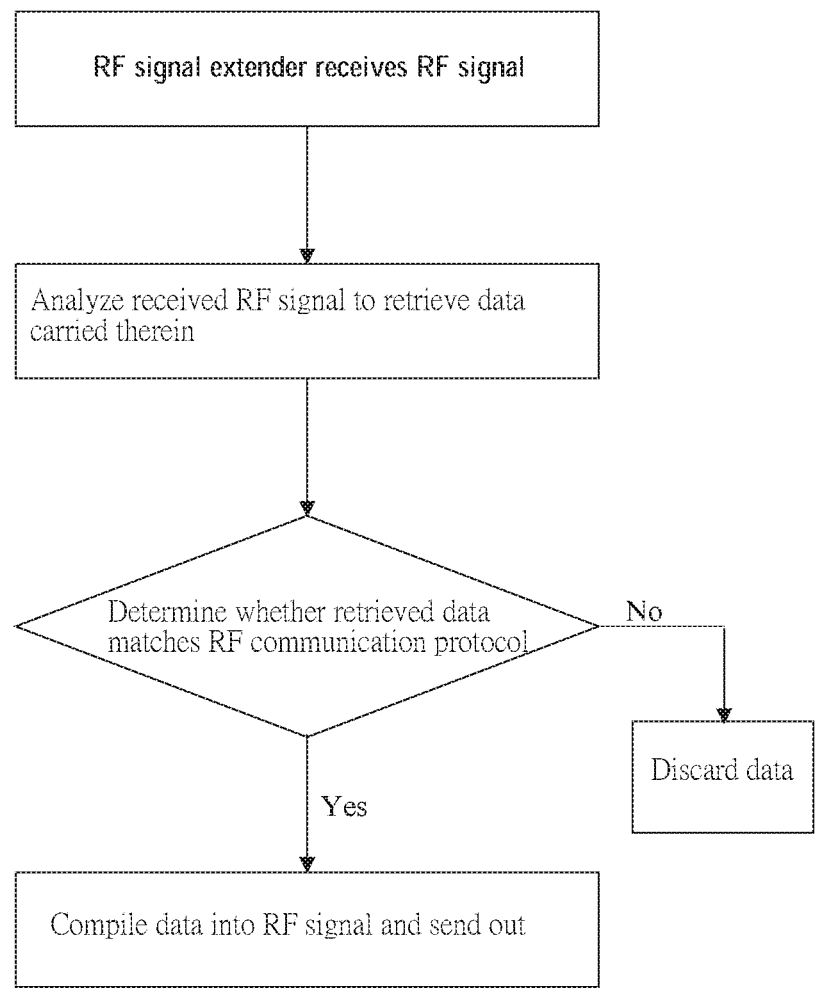
FIG. 2 is a flowchart of the method of extending RF signals of the above embodiment.

The method of extending RF signals of the current embodiment is executed by the RF signal extender 30, including the following steps shown in FIG. 2:

The RF signal extender 30 receives an RF signal with the RF transceiver module, and the RF signal mentioned herein may be sent out by the first electronic device 10 or the second electronic device 20, and may be also sent out by a device of another wireless control system.

The RF signal extender 30 analyzes the received RF signal to retrieve a piece of data carried in the RF signal.

The RF signal extender 30 determines whether the retrieved piece of data follows an RF communication protocol of the wireless control system or not.

If so, the RF signal is considered to be sent out by one of the devices belong to the wireless control system. The piece of data is then compiled into an RF signal and sent out through the RF transceiver module.

If not, the RF signal is considered to be sent out by a device of another wireless control system. Therefore, the piece of data will be discarded, and will not be compiled into an RF signal.

In the current embodiment, the steps of determining whether the retrieved piece of data is in line with the RF communication protocol is performed by checking a header and a trailer in the piece of data; if the header and the trailer match a predetermined header and a predetermined trailer defined by the RF communication protocol, the retrieved piece of data would be considered to follow the RF communication protocol.

In practice, in addition to checking the header and the trailer, a length of the retrieved piece of data can be also checked. If the length matches a predetermined length defined by the RF communication protocol, the retrieved piece of data would be considered to follow the RF communication protocol. The aforementioned checking methods (i.e., checking the header and the trailer, and checking the length of the data) could be both applied, or only one of them is applied.

In the current embodiment, the method of extending RF signals further includes the step of counting times a piece of data is discarded in a period of time, and generating a warning message once the counts reach a predetermined count. For example, if 100 pieces of data are uninterruptedly discarded in 10 minutes, then generate the warning message to alert the user that the RF signals transmitted by the first electronic device 10 or the second electronic device 20 might go wrong. The warning message could be issued through light and/or sound. In the current embodiment, the RF signal extender 30 compiles the warning message into an RF signal, and sends it out through the RF transceiver module. Since the first electronic device 10 and the second electronic device 20 are located in the third RF signal coverage area, at least one of the first electronic device 10 and the second electronic device 20 could receive the RF signal carrying the data of the warning message for further inspection. For instance, the warning message could be transmitted to the portable device 40. In other words, if someone mistakenly installs a first electronic device or a second electronic device of another wireless control system into the current wireless control system, the RF signal extender 30 would not transfer the RF signals of the incorrectly installed first electronic device or second electronic device, and would further issue a warning message to indicate a misuse situation is happening.

In this way, unconditional RF signal transmissions could be avoided, whereby to prevent interferences of RF signals in the wireless control system. A method of extending RF signals of another embodiment is illustrated below.

Figure 3:
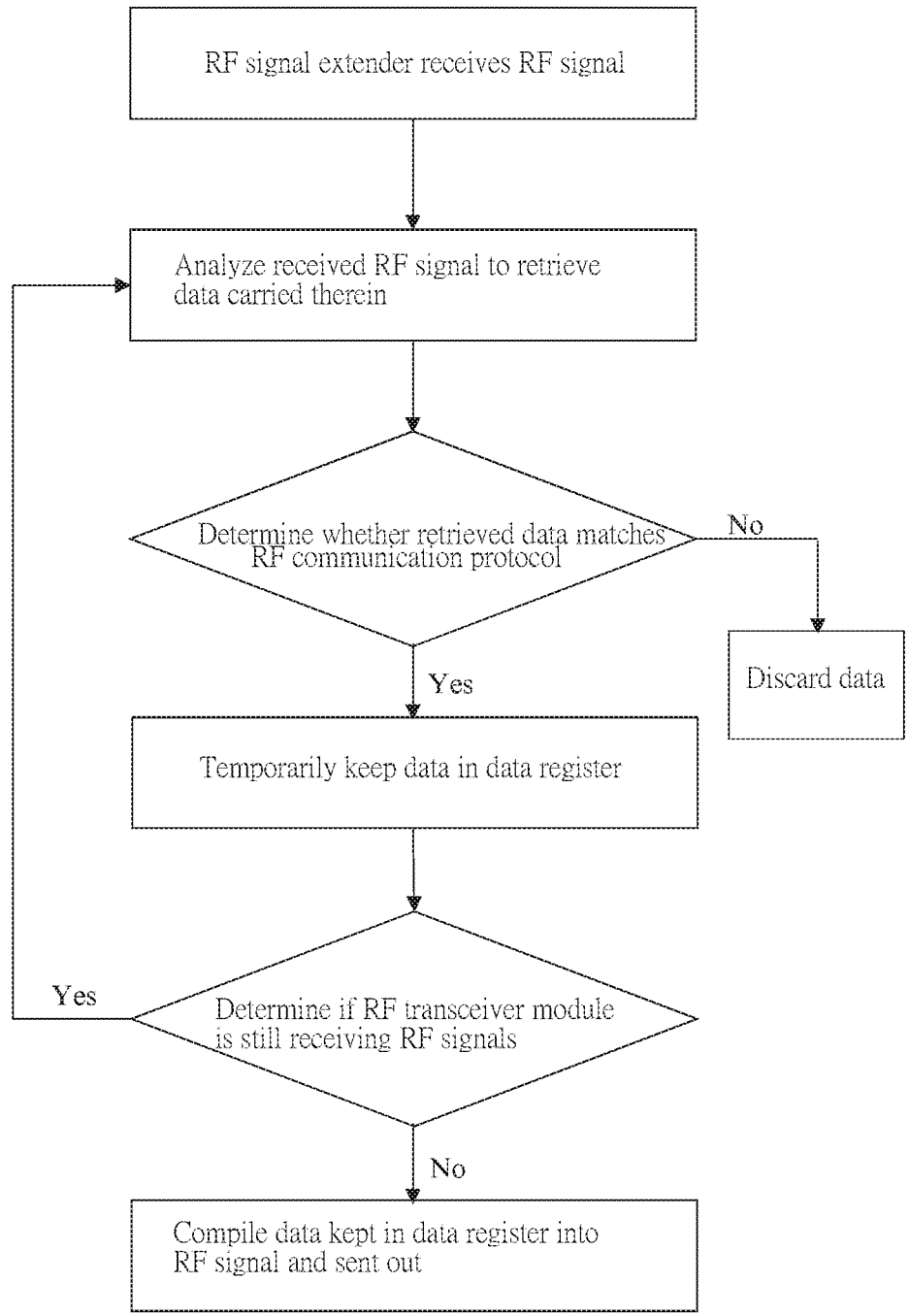
FIG. 3 is a flowchart of the method of extending RF signals of a second embodiment.

The method of extending RF signals of the second embodiment of the present invention is shown in FIG. 3, which is based on the first embodiment. To determine whether the data matches the RF communication protocol of the wireless control system, the An RF signal extender 30 performs the following steps:

Temporarily keep the data in a data register (not shown), wherein the data register is a FIFO (First In First Out) register in the current embodiment.

Check if the RF transceiver module is still receiving RF signals.

If no, compile the data kept in the data register into an RF signal and then send it out through the RF transceiver module;

If yes, analyze the received RF signal to retrieve the data carried in the RF signal; go back to the previous step when the retrieved piece of data is considered to follow the RF communication protocol, so that the data can be temporarily kept in the data register; wait until the RF transceiver module no longer receives RF signals, and send out the data kept in the data register in a first-in-first-out order.

With the aforementioned design, the method of extending RF signals in a wireless control system presented in the present invention could not only expand the total RF signal coverage area of the wireless control system, but also ensure that the RF signals transmitted by the RF signal extender would follow the RF communication protocol of the wireless control system, whereby to reduce the interferences caused by RF signals from other wireless control systems.

It must be pointed out that the embodiments described above are only some preferred embodiments of the present invention. All equivalent methods which employ the concepts disclosed in this specification and the appended claims should fall within the scope of the present invention.

What is claimed is:

1. A method of extending Radio Frequency (RF) signals in a wireless control system, wherein the wireless control system includes a first electronic device, a second electronic device, and an RF signal extender; the first electronic device has a first RF signal coverage area, and the second electronic device has a second RF signal coverage area; the second electronic device is located out of the first RF signal coverage area; the first RF signal coverage area partially overlaps the second RF signal coverage area, and the RF signal extender is located in an overlapping area between the first RF signal coverage area, and the second RF signal coverage area; the RF signal extender has a third RF signal coverage area; the first electronic device and the second electronic device are both located in the third RF signal coverage area; the method of extending RF signals is applied to the RF signal extender, comprising the steps of:

A. receiving an RF with the RF signal extender, wherein a working frequency of the RF signal is 433 MHz or 315 MHz;

B. analyzing the RF signal with the RF signal extender which is received by the RF signal extender to retrieve a piece of data carried in the RF signal; and C. determining whether the piece of data which is retrieved matches an RF communication protocol in the wireless control system with the RF signal extender; if the piece of data which is retrieved matches the RF communication protocol in the wireless control system, compiling the piece of data into another RF signal and transmitting the another RF signal with the RF signal extender; otherwise, discarding the piece, of data Which is retrieved; wherein step C further comprises the following steps to compile the piece of data into the another RF signal:

C1. keeping the piece of data in a data register temporarily with the RF signal extender;

C2. checking if there are more RF signals still being received with the RF signal extender; if no, compiling the piece of data kept in the data register into the another RF signal with the RF signal extender and transmitting the another RF signal with the RF signal extender; if yes, analyzing every one of the more RF signals to retrieve a piece of data carried therein with the RF signal extender; and when the piece of data which is retrieved is considered to match the RF communication protocol, going back to the step C1;

wherein the method further comprises a step of counting times that the piece of data is discarded in a period of time and generating a warning message when counts reach a predetermined count.

2. The method of claim 1, wherein, in step C, a header and a trailer of the piece of data which is retrieved are checked by the RF signal extender to see if the header and the trailer match a predetermined header and a predetermined trailer defined in the RF communication protocol; if yes, the piece of data is compiled into the another RF signal and sent out by the RF signal extender; if no, the piece of data is discarded by the RF signal extender.

3. The method of claim 2, further comprising the step of transmitting the warning message with an RF signal to at least one of the first electronic device and the second electronic device with the RF signal extender.

4. The method of claim 1, wherein, in step C, a length of the piece of data which is retrieved is checked by the RF signal extender to see if the length matches a predetermined length defined in the RF communication protocol; if yes, the piece of data is compiled into the another RF signal and sent out by the RF signal extender; if not, the piece of data is discarded by the RF signal extender.

5. The method of claim 4, further comprising the step of transmitting the warning message with an RF signal to at least one of the first electronic device and the second electronic device with the RF signal extender.

* * * * *